(12) United States Patent
Li et al.

(10) Patent No.: US 9,230,465 B2
(45) Date of Patent: Jan. 5, 2016

(54) STEREOSCOPIC DISPLAY APPARATUS AND ADJUSTMENT METHOD

(71) Applicant: SuperD Co. Ltd., Shenzhen (CN)

(72) Inventors: Dongfang Li, Shenzhen (CN); Zhang Ge, Shenzhen (CN); Lei Song, Shenzhen (CN); Ning Liu, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 454 days.

(21) Appl. No.: 13/903,004

(22) Filed: May 28, 2013

(65) Prior Publication Data

US 2013/0321246 A1 Dec. 5, 2013

(30) Foreign Application Priority Data

May 30, 2012 (CN) .......................... 2012 1 0173542

(51) Int. Cl.
*G09G 3/00* (2006.01)
*H04N 13/04* (2006.01)

(52) U.S. Cl.
CPC ........... *G09G 3/003* (2013.01); *H04N 13/0409* (2013.01); *H04N 13/0468* (2013.01); *H04N 13/0497* (2013.01); *G09G 2354/00* (2013.01)

(58) Field of Classification Search
CPC ............. G09G 3/003; H04N 13/0409; H04N 13/0468; H04N 13/04; H04N 13/01477
See application file for complete search history.

(56) References Cited

U.S. PATENT DOCUMENTS

| 7,116,477 B2 | 10/2006 | Nishihara et al. | |
| 2004/0150884 A1* | 8/2004 | Domjan | G02B 27/0172 359/462 |
| 2005/0190443 A1* | 9/2005 | Nam | G02B 27/2214 359/464 |
| 2012/0242569 A1* | 9/2012 | Hamagishi | H04N 13/0409 345/156 |

FOREIGN PATENT DOCUMENTS

| CN | 101201498 A | 6/2008 |
| CN | 102122077 A | 7/2011 |
| CN | 102413352 A | 4/2012 |

* cited by examiner

*Primary Examiner* — Aneeta Yodichkas
*Assistant Examiner* — Saifeldin Elnafia
(74) *Attorney, Agent, or Firm* — Anova Law Group, PLLC (57) ABSTRACT

A 3D display system for displaying a 3D image includes a tracking unit, a pixel panel, a grating array, and a control unit. The tracking unit is configured to determine a spatial position of a viewer of the 3D display system. The pixel panel contains alternatingly arranged display units from two or more view images of the 3D image, and the grating array is coupled to the pixel panel to separate light from the view images from the pixel panel. The control unit is configured to adjust certain parameters of the grating array such that a maximum width of horizontal projection of edges of adjacent display units through the grating array is less than or equal to a inner-eye distance, and a minimum width of horizontal projection of two edges of a single display unit through the grating array is greater than or equal to an outer-eye distance.

12 Claims, 9 Drawing Sheets

STEREOSCOPIC DISPLAY APPARATUS AND ADJUSTMENT METHOD

CROSS-REFERENCES TO RELATED APPLICATIONS

This application claims the priority of Chinese patent application number 201210173542.X, filed on May 30, 2012, the entire contents of which are incorporated herein by reference.

FIELD OF THE INVENTION

The present invention generally relates to three-dimensional (3D) display technologies and, more particularly, to the methods and systems for adjusting 3D display parameters dynamically.

BACKGROUND

When a person observes a three-dimensional (3D) object, because the person's left eye and right eye are in different horizontal positions separated by a small distance, the two object images viewed by the left eye and the right eye are different. The difference between the two object images is called parallax. Because of the existence of the parallax, the person can feel changes in depth in a 3D world.

With the rapid development of 3D display technologies, autostereoscopic 3D technology is being used in more applications in the fields of mobile phones, tablets, notebooks, and TV, etc., and a series of related products have entered market. An autostereoscopic display apparatus generally includes a display panel and an optical grating. Optical gratings are mainly divided into two categories: slit gratings and lens gratings. Slit gratings are based on pinhole imaging principle, such as dynamic slit gratings, while the lens gratings are based on lens refraction/reflection principle, such as dynamic liquid crystal lens gratings.

However, many existing 3D display devices have certain limitations on hardware and their optical gratings often cause light interference and diffraction, etc. The display effects of those display devices may be undesired.

The disclosed methods and systems are directed to solve one or more problems set forth above and other problems.

BRIEF SUMMARY OF THE DISCLOSURE

One aspect of the present disclosure includes a third-dimensional (3D) display system for displaying a 3D image. The 3D display system includes a tracking unit, a pixel panel, a grating array, and a control unit. The tracking unit is configured to determine a spatial position of a viewer of the 3D display system. The pixel panel contains alternatingly arranged display units from two or more view images of the 3D image, and the grating array is coupled to the pixel panel to separate light from the two or more view images from the pixel panel. Further, the control unit is configured to adjust certain parameters of the grating array such that a maximum width of horizontal projection of edges of adjacent display units through the grating array is less than or equal to a inner-eye distance, and a minimum width of horizontal projection of two edges of a single display unit through the grating array is greater than or equal to an outer-eye distance.

Another aspect of the present disclosure includes a method for a 3D display system. The 3D display system has a pixel panel containing alternatingly arranged display units from two or more view images of a 3D image and a grating array coupled to the pixel panel to separate light from the two or more view images from the pixel panel. The method includes determining a spatial position of a viewer of the 3D display system, and adjusting certain parameters of the grating array such that a maximum width of horizontal projection of edges of adjacent display units through the grating array is less than or equal to a inner-eye distance, and a minimum width of horizontal projection of two edges of a single display unit through the grating array is greater than or equal to an outer-eye distance.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
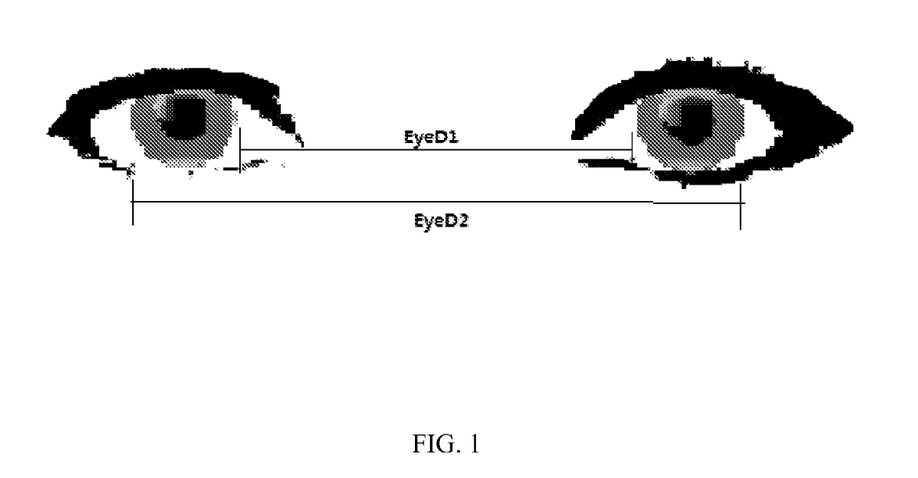
FIG. 1 illustrates an exemplary viewer's eyes and relevant parameters for 3D display calculations.

FIG. 1 illustrates an exemplary viewer's eyes and relevant parameters for 3D display calculations. As shown in FIG. 1, an inner distance between the left eye and the right eye is EyeD1 (i.e., inner-eye distance), and an outer distance between the left eye and the right eye is EyeD2 (i.e., outer-eye distance). The inner-eye distance and/or the outer-eye distance may be assigned various values, such as theoretical values, statistical values, or empirical values. If the viewer can perceive 3D display on a display panel when the distance between the viewer and the display panel is Z, it is considered that the distance between the viewer's eyes and the optical gratings of the display panel is Z. The center point between two eyes may be referred as the center-eye point.

Figure 12:
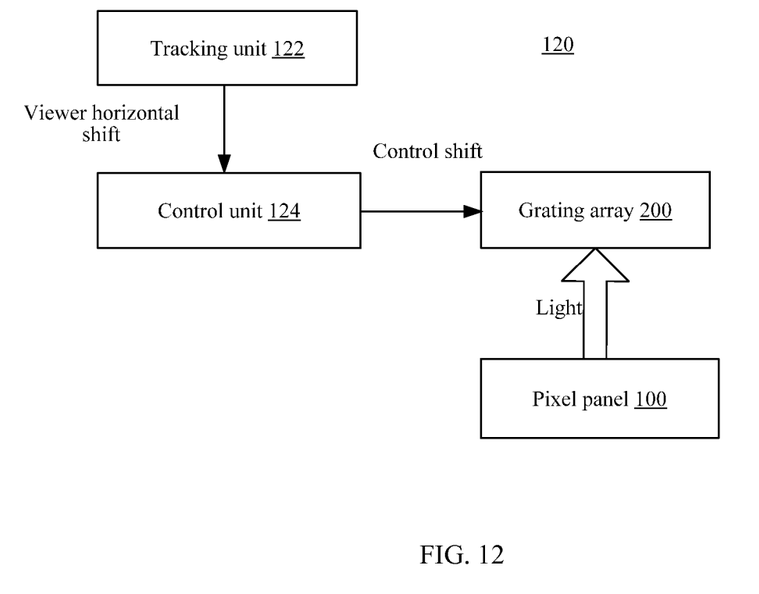
FIG. 12 illustrates an exemplary 3D display system consistent with the disclosed embodiments.

FIG. 12 illustrates an exemplary 3D display system 120 consistent with the disclosed embodiments. As shown in FIG. 12, 3D display system 120 includes a tracking unit 122, a control unit 124, a grating array 200, and a pixel panel 100. Certain unit(s) may be omitted and other units may be added.

Tracking unit 122 may include any appropriate tracking device configured to track movement of a viewer or viewers. That is, tracking unit 122 may include any appropriate device for obtaining the viewer's spatial position (e.g., eye position) in real-time, such as a camera, an infrared sensing device, or any other sensors. For example, tracking unit 122 may track eye movement of the viewer and may send the position information of the viewer to control unit 124 for further processing.

Grating array 200 may include any appropriate optical gratings configured to implement 3D displays. For example, grating array 200 may be a slit grating array or a lens grating array. Other grating arrays may also be used.

Pixel panel 100 may include any appropriate display device with a display panel containing image pixels for displaying 2D/3D images. For example, pixel panel 100 may include any appropriate type of plasma display panel (PDP) display, field emission display (FED), cathode ray tube (CRT) display, liquid crystal display (LCD), organic light emitting diode (OLED) display, or other types of displays.

Figure 13:
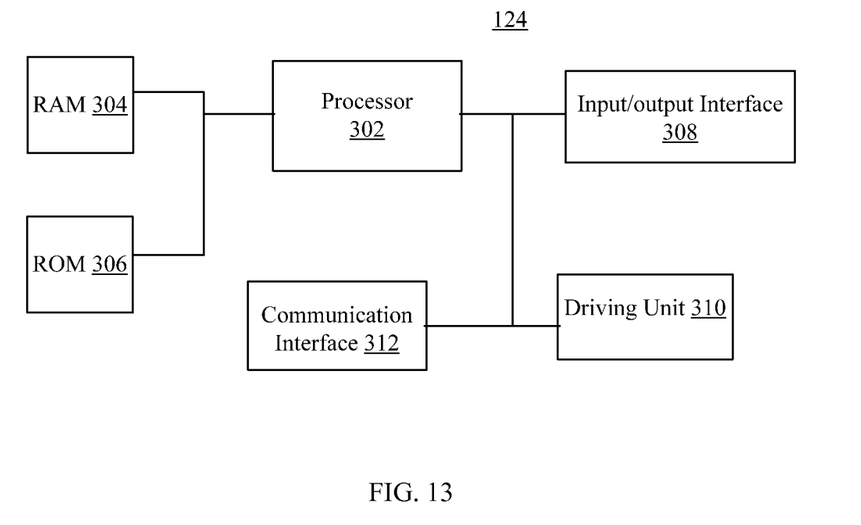
FIG. 13 illustrates an exemplary control unit consistent with the disclosed embodiments.

Control unit 124 may include any appropriate processing unit for controlling operation of 3D display system 120. FIG. 13 illustrates an exemplary control unit 124 consistent with the disclosed embodiments.

As shown in FIG. 13, control unit 124 may include a processor 302, a random access memory (RAM) unit 304, a read-only memory (ROM) unit 306, an input/output interface unit 308, a driving unit 310, and a communication interface 312. Other components may be added and certain devices may be removed without departing from the principles of the disclosed embodiments.

Processor 302 may include any appropriate type of graphic processing unit (GPU), general-purpose microprocessor, digital signal processor (DSP) or microcontroller, and application specific integrated circuit (ASIC), etc. Processor 302 may execute sequences of computer program instructions to perform various processes associated with control unit 124. The computer program instructions may be loaded into RAM 304 for execution by processor 302 from read-only memory 306 to process various 3D images.

Input/output interface 308 may be provided for users to input information into 3D display system 100 or for the users to receive information from 3D display system 100. For example, input/output interface 308 may include any appropriate input device, such as a remote control, a keyboard, a mouse, an electronic tablet, a voice communication device, or any other optical or wireless input device. Further, driving unit 310 may include any appropriate driving circuitry to drive various devices, such as pixel panel 100 and/or grating array 200.

Further, communication interface 312 may provide communication connections such that control unit 124 may be accessed by and/or communicate with other processors or systems through computer networks or other communication links via various communication protocols, such as transmission control protocol/internet protocol (TCP/IP) and hyper text transfer protocol (HTTP).

Figure 2:
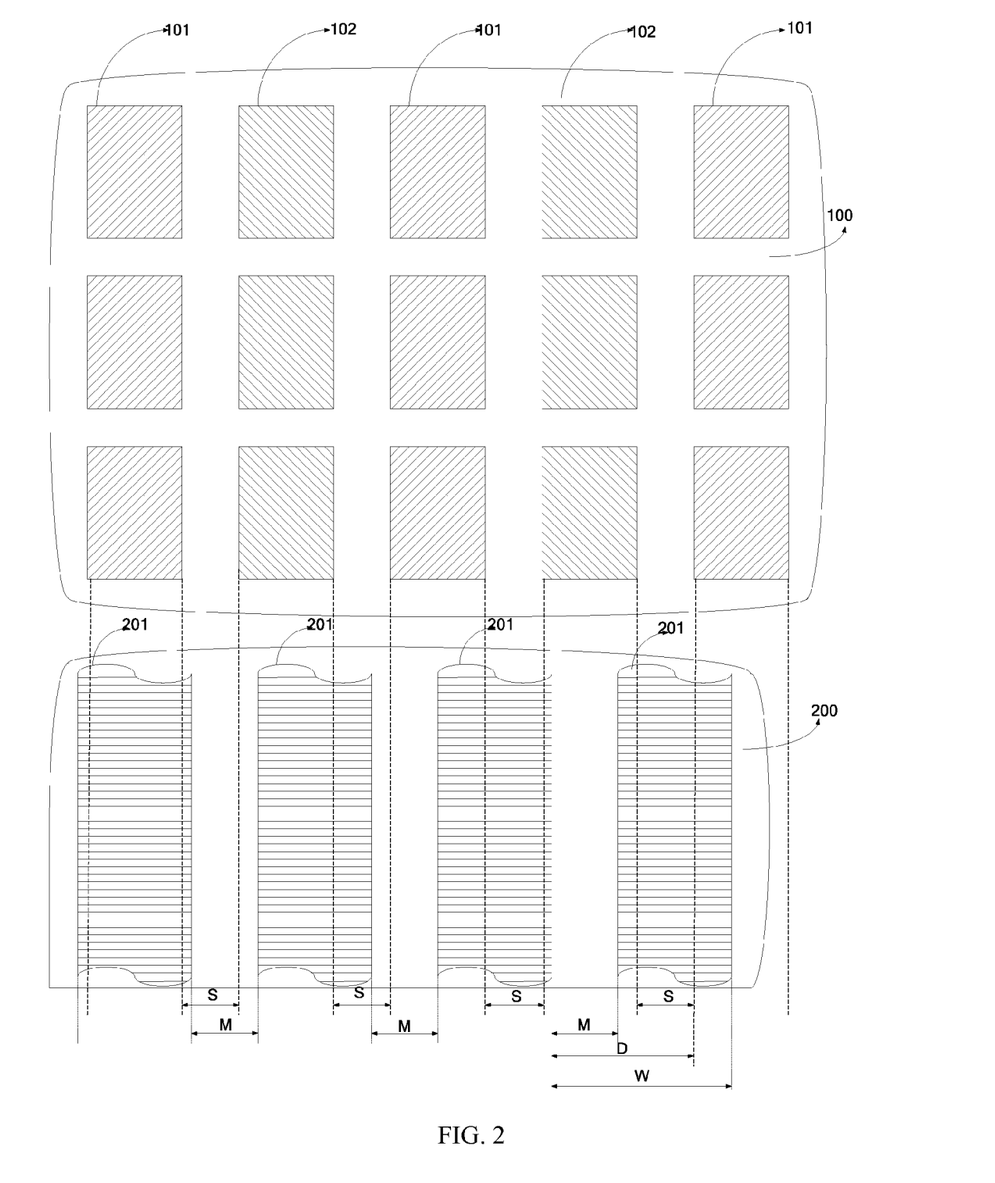
FIG. 2 illustrates an exemplary 3D display panel for displaying 3D images consistent with the disclosed embodiments.

Returning to FIG. 12, the 3D display system 120 may be configured to display 2D/3D images on pixel panel 100. The grating array 200 may perform certain 3D display functionalities, such as view image separation, to facilitate 3D display. The grating array 200 and pixel panel 100 may be referred as a 3D display panel. FIG. 2 illustrates an exemplary 3D display panel for displaying 3D images. For illustrative purposes, a 3D image may contain two view images, a left image for a viewer's left eye and a right image for a viewer's right eye. Any number of view images may be used.

As shown in FIG. 2, the 3D display panel includes pixel panel 100 and grating array 200. Both left image and right image are displayed on pixel panel 100 via pixels on pixel panel 100. More particularly, pixel groups 101 include pixels for the first view image (e.g., the left image) and pixel groups 102 include pixels for the second view image (e.g., the right image). Further, columns of pixel group 101 and pixel group 102 are arranged in alternating fashion, and the width of each of the pixel group 101 and pixel group 102 may be denoted as D.

Pixels in the pixel groups 101 and pixel groups 102 may include any appropriate type of pixels, such as pixels covered with a crystal liquid layer or other pixels of certain light emitting apparatus, e.g., light emitting devices. Further, each pixel group 101 or pixel group 102 may contain one or more main pixels, or may contain one or more sub-pixels. A pixel group, a main pixel, or a sub-pixel may be referred as a display unit. As described above, the grating array 200 may be a slit grating array or a lens grating array.

In general, to cause three-dimensional (3D) effect, two or more view images with certain parallax may need to be displayed on the pixel panel. That is, display units (e.g., pixels or sub-pixels) of two view images may be arranged alternatingly, or display units from four view images may be arranged alternatingly. The number of view images is not limiting, and any number of view images may be used.

Figure 3:
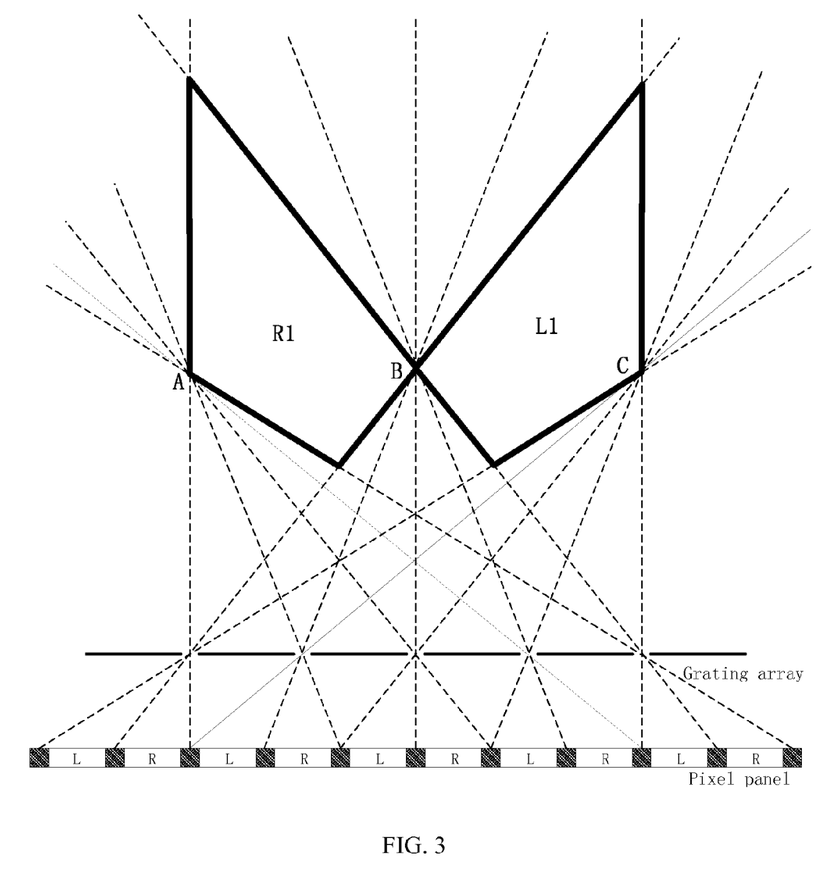
FIG. 3 illustrates an exemplary 3D display panel arrangement consistent with the disclosed embodiments.

In certain embodiments, there may be a connection region between adjacent pixel groups 101 and 102, with a width S in the horizontal direction. These rectangular regions formed by the alternatingly arranged pixel groups 101 and pixel groups 102 are often referred to as a "black matrix." Generally, light cannot pass through the black matrix into the grating array, which causes the 3D image formed by the light passing through the grating array having stable bright and dark areas (i.e., certain bright areas intertwined with certain dark areas). Thus, the user viewing experience may be affected. FIG. 3 illustrates an exemplary 3D display panel arrangement.

As shown in FIG. 3, the convergence points A, B, and C of the equatorial lines of the black matrix passing through the grating array (e.g., a slit grating) may have the weakest light intensity. If a viewer's eye is located at point A, B, or C, the viewer may see almost all of the black borders of the black matrix, and intensity of the light entering the viewer's eye is significantly reduced. The regions L1 and R1 are considered as the viewing area for the viewer to view 3D images from the 3D display panel.

However, regions L1 and R1 are considered as the viewing area if only the center points of the black matrix are calculated, in fact, the regions L1 and R1 already contain dark areas caused by the entire black matrix. More generally, at the edges of the black matrix, being the boundaries of the alternatingly arranged pixels from two different view images, lights from different view images may be mixed after passing through the light separation device (e.g., a slit grating). This may cause interference or crosstalk, affecting the 3D display viewing effect.

Figure 4:
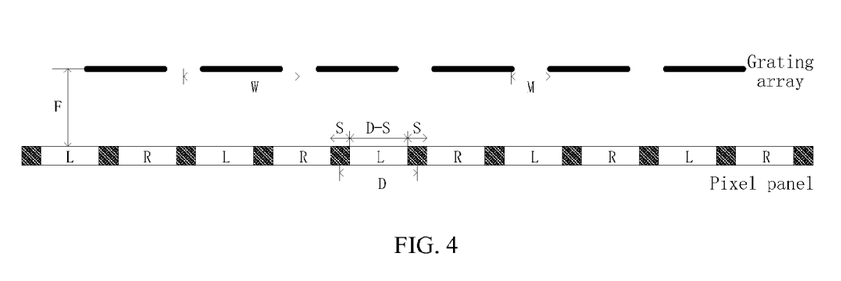
FIG. 4 illustrates an exemplary 3D display panel arrangement consistent with the disclosed embodiments.

FIG. 2 and FIG. 4 illustrate further details of the arrangement of the grating array and the pixel panel. As shown in FIG. 2 and FIG. 4, the grating array 200 includes slit gratings 201. The period for the slit gratings 201 is W, the width of the slit opening between adjacent slit gratings is M, and M/W is the open ratio or the light transmittance ratio of the slit gratings. F is the distance between the slit gratings panel and the pixel panel.

Further, in the pixel panel 100, the width of a main pixel is D, and the width of the black boundary frame between two adjacent main pixels is S, i.e., the width of the connection region between the two adjacent pixels. Thus, the actual light emission width of a single main pixel on the pixel panel is (D-S). Each main pixel may be constituted by three sub-pixels, R, G, and B.

Figure 5:
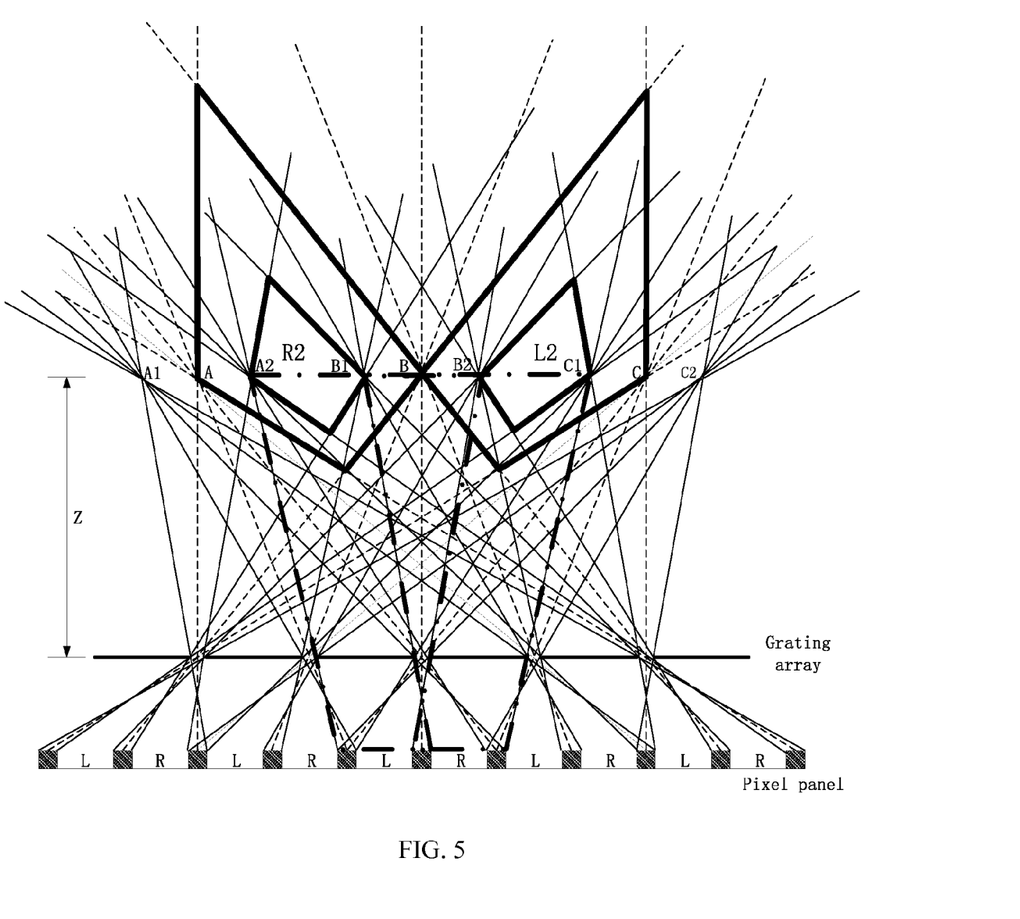
FIG. 5 illustrates another exemplary 3D display panel arrangement with a spatial distribution of the black matrix consistent with the disclosed embodiments.

FIG. 5 shows a spatial distribution of the black matrix through the slit gratings when two view images are used for 3D image arrangement. As shown in FIG. 5, area L is a region for displaying the left image, area R is a region for displaying the right image. The viewing areas are the two large diamond-shaped areas, among which one large diamond-shape area has vertex points including points A and B, and the other large diamond-shaped area has vertex points including points B and C. Because the black matrix has certain width, the horizontal line connecting the points A, B, and C may have stable bright and dark areas.

Thus, as shown in FIG. 5, the connection line between the edges of the black matrix and the edges of the slit grating openings, together with their extension lines, form the boundary of the viewable bright and dark areas. Further, along the horizontal line connecting points A, B and C, the line segment A1A2, the line segment B1B2, and the line segment C1C2 form the spatial distribution region of the black matrix. The points A, B, and C are "darkest" center points, i.e., the brightness increases from points A, B, and C to the edges of the respective line segments.

For example, from point B (as the center point) towards the point B1 and the point B2, the viewer can see the brightness of the spatial image gradually increases due to the black matrix. However, if the viewing range exceeds the diamond-shaped area containing the line segment B1B2, the diamond-shaped area containing the line segment A1A2, or the diamond-shaped area containing the line segment C1C2, the viewer can see even or stable brightness of the images. That is, when the viewer's eyes are located within the diamond-shaped region R2, having vertex points A2 and B1, or within the diamond-shaped region L2, having vertex points B2 and C1, the influence of crosstalk from the black matrix is significantly reduced.

Thus, during operation, because the viewer may change position such that the viewer's eyes may be no longer within desired regions for viewing the 3D image. The grating array 200 may be dynamically adjusted so that the viewer's eyes can be kept in favorable position to view the 3D image.

For example, the 3D display system 120 may adjust the open ratio M/W of the slit gratings and/or the distance F between the grating array and the pixel panel such that the maximum width B1B2 of the horizontal projection of the black matrix is less than or equal to the inner-eye distance EyeD1, and the minimum width A2C1 of the horizontal projection of alternating black matrix is greater than or equal to the outer-eye distance EyeD2. Under these conditions, the viewer can watch the 3D images with substantially less crosstalk or interference caused by the black matrix.

More particularly, according to the various light projection relationships, the following formulas can be obtained:

The length |B1B2| of line segment B1B2 is less than or equal to EyeD1:

$$|B1B2| = \frac{M \times (F+Z) + Z \times S}{F} \leq EyeD1 \qquad (1)$$

The length |A2C1| of the line segment A2C1 is greater than or equal to EyeD2:

$$|A2C1| = \frac{(2W-M) \times (F+Z) - (2 \times D + S) \times Z}{F} \geq EyeD2 \qquad (2)$$

When the distance F between the slit grating and the pixel panel is fixed, the slit grating may include a dynamic slit grating such that the width M of the dynamic slit grating or the open ratio M/W of the dynamic slit grating can be adjusted to satisfy the formulas (1) and (2).

In practical, in addition to formula (1), the slit grating may be configured to meet 0<M<W, thus:

$$M < \min\left\{\frac{F \times (EyeD1+S)}{F+Z} - S, W\right\} := Cnd1 \qquad (3)$$

That is, the opening width M of the slit grating is smaller than the smaller of $$\frac{F \times (EyeD1+S)}{F+Z} - S$$

and W; wherein the smaller of $$\frac{F \times (EyeD1+S)}{F+Z} - S$$

and W can be represented by the first threshold Cnd1.

It can also be obtained:

$$\frac{M}{W} < \min\left\{\frac{F \times (EyeD1+S)}{W \times (F+Z)} - \frac{S}{W}, 1\right\} := Cnd1';$$

That is, the aperture ratio M/W of the slit grating is smaller than the smaller of $$\frac{F \times (EyeD1+S)}{W \times (F+Z)} - \frac{S}{W}$$

and 1; wherein the smaller of $$\frac{F \times (EyeD1+S)}{W \times (F+Z)} - \frac{S}{W}$$

and 1 is represented by Cnd1'.

Similarly, based on formula (2) and the practical condition of 0<M<W, it can be obtained:

$$M < \min\left\{[2W-(2D+S)] - \frac{F \times [EyeD2-(2D+S)]}{(F+Z)}, W\right\} := Cnd2 \qquad (4)$$

That is, the opening width M of the slit grating is smaller than the smaller of $$[2W-(2D+S)]-\frac{F\times[EyeD2-(2D+S)]}{F+Z}$$

and W; wherein the smaller of $$[2W-(2D+S)]-\frac{F\times[EyeD2-(2D+S)]}{F+Z}$$

and W can be represented by the second threshold Cnd2.
Also:

$$\frac{M}{W}<\min\left\{\left[2-\frac{(2D+S)}{W}\right]-\frac{F\times[EyeD2-(2D+S)]}{W\times(F+Z)},1\right\}:=Cnd2';$$

That is, the open ratio M/W of the slit grating is smaller than the smaller of $$\left[2-\frac{(2D+S)}{W}\right]-\frac{F\times[EyeD2-(2D+S)]}{W\times(F+Z)}$$

and 1; wherein the smaller of $$\left[2-\frac{(2D+S)}{W}\right]-\frac{F\times[EyeD2-(2D+S)]}{W\times(F+Z)}$$

and 1 is represented by Cnd2'.
For practical values, M may satisfy:

$$0<M\leq\min\{Cnd1,Cnd2\} \quad (5)$$

Thus, based on formula (5), the opening width M of the slit grating can be obtained, and the open ratio M/W can also be obtained.

Although adjusting the opening width or the open ratio alone can be used in operation, other parameters may also be adjusted alone or in combination. For example, according to the formula (1) and (2), any one or more of the distance F between the slit grating and the pixel panel, the grating period W, and the opening width can be adjusted to satisfy the formula (1) and (2).

Figure 6:
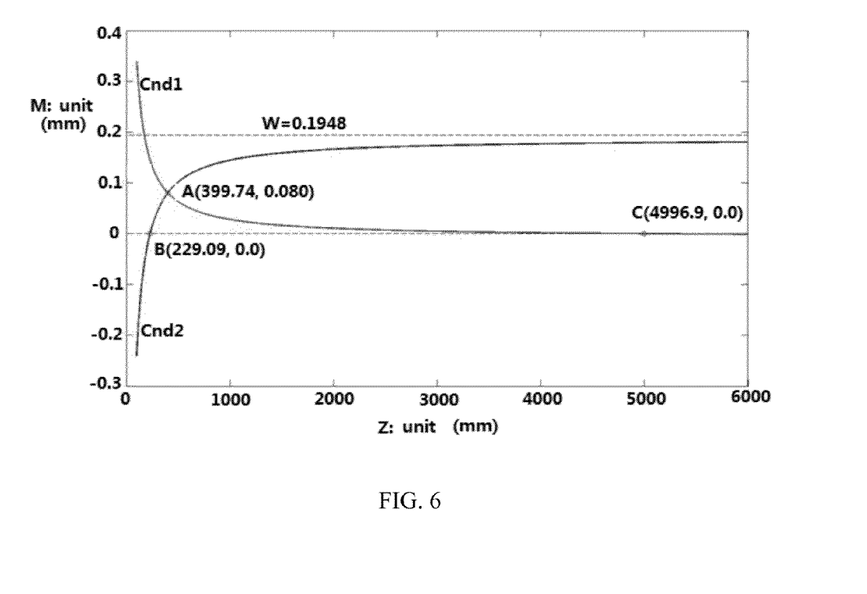
FIG. 6 illustrates exemplary relationship among various system parameters consistent with the disclosed embodiments.

For example, when provided F=0.6 mm, EyeD1=65-7 mm, EyeD2=65++7 mm, D=0.1950*0.5 mm, S=D/14.0 mm, W=0.1948 mm, according to formula (3) and (4), various parameters may be derived, as shown in FIG. 6.

As shown in FIG. 6, the horizontal axis represents the viewing distance Z, and the vertical axis represents M. According to formula (5), the region ABC enclosed by the curve Cnd1, the curve Cnd2, and the horizontal axis M=0 is a feasible region (i.e., solvable region).

Judging from the feasible region in FIG. 6, when Z<229.1, it requires that M<0 in order to avoid the influence of crosstalk from the black matrix. However, in reality, the actual opening width M is always greater than zero. Thus, when the distance between the human eye and the display screen is smaller than 229.1 mm, no practical significance may exist.

Similarly, no practical significance exists when the distance between the human eye and the display screen is greater than 4997 mm. Further, when Z=399.74 mm, M can take the maximum value of M=0.080 mm, at which point the overall brightness of the display screen is maximized without seeing the black matrix by the viewer. When the 3D display system is a mobile phone, a tablet, or a notebook, etc., the average distance between the user's eye and the display screen is about 400 mm, so the slit opening width can be set as M=0.080 mm at this distance such that the black matrix can be avoided and the screen brightness may be maximized (i.e., M is set to an optimum value).

Further, when the viewer moves while viewing the 3D display, the slit gratings can be adjusted in real-time such that the viewer's left and right eyes are kept in the diamond-shaped area L2 and diamond-shaped region R2, respectively, to significantly reduce the effect of the black matrix.

That is, the 3D display system 120 may perform a real-time tracking on the spatial position of the viewer(s) to dynamically adjust parameters of the slit grating and to also adjust the arrangement of display units (e.g., pixels) to improve the 3D display.

Figure 7:
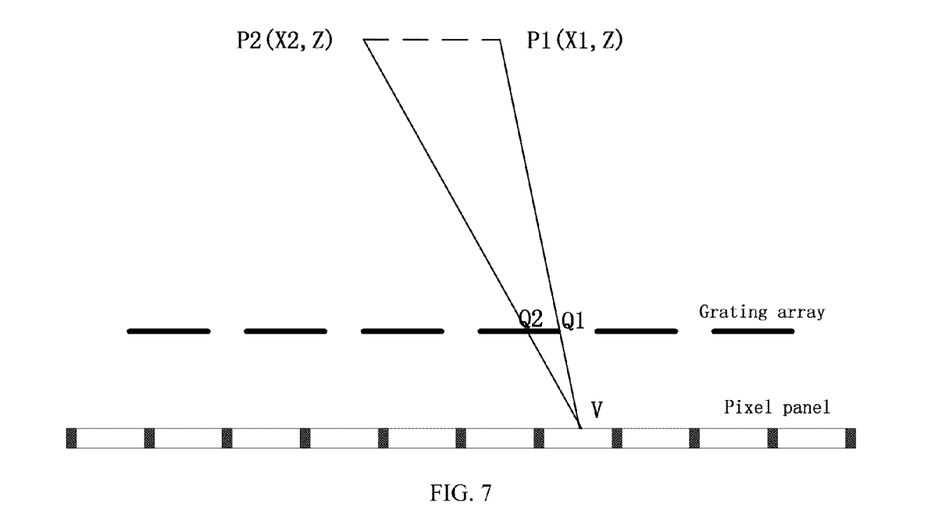
FIG. 7 illustrates an 3D display panel with a horizontal shift of viewer position consistent with the disclosed embodiments.

As shown in FIG. 5, when the slit grating array 200 is arranged periodically, and the opening width of the slit grating is kept constant, the horizontal spacing among the inter-section points A, A1, A2, B, B1, B2, C, C1, C2 is also unchanged, i.e., the horizontal width of the projection area of the black matrix on the plane containing the line segment AC is unchanged, and only shifts horizontally on the plane containing the line segment AC. FIG. 7 illustrates a horizontal shift of viewer position with respect to the 3D display panel.

As shown in FIG. 7, at a first time t1, the tracking unit of the 3D display system 120 obtains the position of the center-eye point of the viewer P1(x1,Z), when the viewer can see the pixel V. At a second time t2, the center-eye point of the viewer horizontally shifts to position P2(x2,Z). To allow the viewer to still be able to see the pixel V, the slit grating may be horizontally moved by a horizontal vector $\overrightarrow{(Q2-Q1)}$, at a moving direction opposite to the shift direction of the position of the center eye point of the viewer, as follows:

$$\overrightarrow{(Q2-Q1)}=\left(\frac{F\times(X2-X1)}{F+Z},0\right) \quad (6)$$

Because the slit grating is arranged periodically in the horizontal direction, the horizontal vector in formula (6) can be calculated into the period W to realize the effect of horizontally shifting the slit grating. That is, the grating only needs to be shifted by a remainder of $\overrightarrow{(Q2-Q1)}$ and W. By tracking of the position of the viewer in real-time and adjusting the slit grating accordingly, the influence of crosstalk from the black matrix can be significantly reduced.

Alternatively, the slit grating can also be moved in the direction opposite to the horizontal vector $\overrightarrow{(Q2-Q1)}$, but in the same direction as the shifting direction of the position of the center-eye point. The horizontal vector $\overrightarrow{(Q2-Q1)}$ can also be calculated into the period W to realize the effect of horizontally shifting the slit grating.

The above described embodiments assume that the width S of the connection region between adjacent pixels in the pixel panel is not zero. However, even the width S can be reduced to substantially small or even close to zero, i.e., S=0, the crosstalk or interference can still be a significant factor affecting the 3D display effect.

Figure 8:
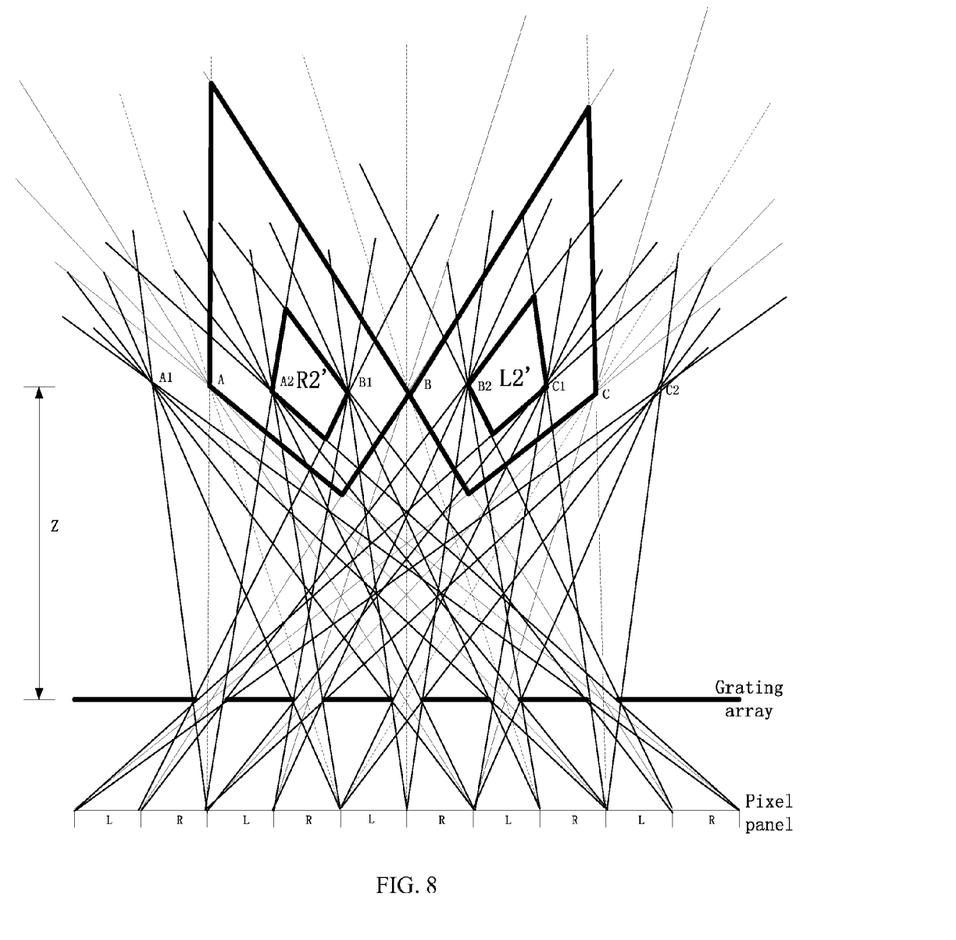
FIG. 8 illustrates another exemplary 3D display panel arrangement consistent with the disclosed embodiments.

As shown in FIG. 8, the viewing areas are the two large diamond-shaped areas, among which one large diamond-shape area has vertex points including points A and B, and the other large diamond-shaped area has vertex points including points B and C. The connection lines of the edges of the adjacent pixel groups and the edges of the slit opening, along with their extension lines, form the boundary of the crosstalk regions.

Thus, along the horizontal line connecting points A, B and C, the line segment A1A2, the line segment B1B2, and the line segment C1C2 form the regions where the viewer can see pixels from both the left image and the right image (i.e., crosstalk). Such crosstalk may be strongest at the points A, B, and C, and may decrease from points A, B, and C to the edges of the respective line segments. When the viewing range exceeds the diamond-shaped areas containing the line segment B1B2, the diamond-shaped area containing the line segment A1A2, or the diamond-shaped area containing the line segment C1C2, the viewer can see only pixels from a single view image (e.g., either left image or the right image). That is, when the viewer's eyes are located within the diamond-shaped region R2', having vertex points A2 and B1, or within the diamond-shaped region L2', having vertex points B2 and C1, the influence of crosstalk is significantly reduced. The viewer's two eyes can see single view images respectively, and the 3D display effect is improved.

Thus, the 3D display system 120 may adjust the open ratio M/W of the slit gratings and/or the distance F between the grating array and the pixel panel such that the maximum width B1B2 of the horizontal projection of the edges of the adjacent display units (e.g., pixels) is less than or equal to the inner-eye distance EyeD1, and the minimum width A2C1 of the horizontal projection of two edges of a display unit is greater than or equal to the outer-eye distance EyeD2. Under these conditions, the viewer can watch the 3D images with substantially less crosstalk or interference.

The length |B1B2| of line segment B1B2 is less than or equal to EyeD1:

$$|B1B2| = \frac{M \times (F+Z)}{F} \leq EyeD1 \qquad (7)$$

Formula (7) is equivalent to formula (1) when S=0. Further, the length |A2C1| of the line segment A2C1 is greater than or equal to EyeD2:

$$|A2C1| = \frac{(2W-M) \times (F+Z) - 2D \times Z}{F} \geq EyeD2 \qquad (8)$$

Formula (8) is equivalent to formula (2) when S=0. When the distance F between the slit grating and the pixel panel is fixed, the slit grating may include a dynamic slit grating such that the open ratio M/W of the dynamic slit grating can be adjusted to satisfy the formulas (7) and (8).

In practical, in addition to formula (7), the slit grating may be configured to meet 0<M<W, thus:

$$M < \min\left\{\frac{F \times EyeD1}{F+Z}, W\right\} := Cnd3 \qquad (9)$$

That is, the opening width M of the slit grating is smaller than the smaller of $$\frac{F \times EyeD1}{F+Z}$$

and W; wherein the smaller of $$\frac{F \times EyeD1}{F+Z}$$

and W can be represented by the third threshold Cnd3.

It can also be obtained:

$$\frac{M}{W} < \min\left\{\frac{F \times EyeD1}{W \times (F+Z)}, 1\right\} := Cnd3';$$

That is, the open ratio M/W of the slit grating is smaller than the smaller of $$\frac{F \times EyeD1}{W \times (F+Z)}$$

and 1; wherein the smaller of $$\frac{F \times EyeD1}{W \times (F+Z)}$$

and 1 is represented by Cnd3'.

Similarly, based on formula (8) and the practical condition of 0<M<W, it can be obtained:

$$M < \min\left\{(2W - 2D) - \frac{F \times (EyeD2 - 2D)}{F+Z}, W\right\} := Cnd4 \qquad (10)$$

That is, the opening width M of the slit grating is smaller than the smaller of $$(2W - 2D) - \frac{F \times (EyeD2 - 2D)}{F+Z}$$

and W; wherein the smaller of $$(2W - 2D) - \frac{F \times (EyeD2 - 2D)}{F+Z}$$

and W can be represented by the fourth threshold Cnd4.

Also:

$$\frac{M}{W} < \min\left\{\left(2 - \frac{2D}{W}\right) - \frac{F \times (EyeD2 - 2D)}{W \times (F+Z)}, 1\right\} := Cnd4';$$

That is, the open ratio M/W of the slit grating is smaller than the smaller of $$\left(2 - \frac{2D}{W}\right) - \frac{F \times (EyeD2 - 2D)}{W \times (F+Z)}$$

and 1; wherein the smaller of $$\left(2 - \frac{2D}{W}\right) - \frac{F \times (EyeD2 - 2D)}{W \times (F + Z)}$$

and 1 is represented by Cnd4'.

For practical values, M may satisfy:

$$0 < M \leq \min\{Cnd3, Cnd4\} \quad (11)$$

Thus, based on formula (11), the opening width M and/or the open ratio M/W of the slit grating can be obtained.

Figure 9:
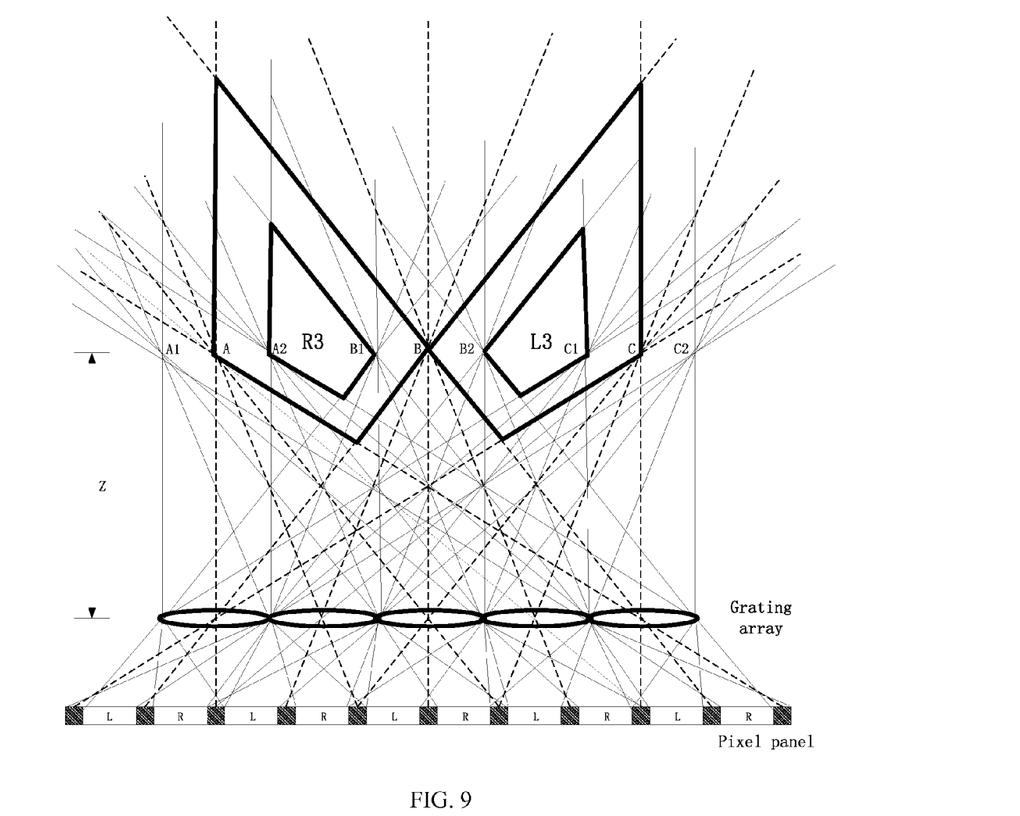
FIG. 9 illustrates an exemplary lens grating based 3D display panel configuration consistent with the disclosed embodiments.

Additionally or optionally, the grating array may be a lens grating array (e.g., a lens array configured to realize the optical grating effect). Both slit grating and lens grating can be used in 3D display equipment to separate light. That is, light of the images on the pixel panel passes through the grating array to form view images with parallax for the viewer to perceive 3D display. FIG. 9 illustrates an exemplary lens grating based 3D display panel configuration.

As shown in FIG. 9, F is the distance between the lens grating and the pixel panel, and Z is the distance between the viewer and the display panel. The black matrix is arranged periodically, causing lights passing through the lens grating to spatially form stable bright and dark areas. Similar to above descriptions on the slit gratings, in FIG. 9, when the viewer's eyes are located within the diamond-shaped region R3, having vertex points A2 and B1, or within the diamond-shaped region L3, having vertex points B2 and C1, the influence of crosstalk from the black matrix is significantly reduced.

Figure 10:
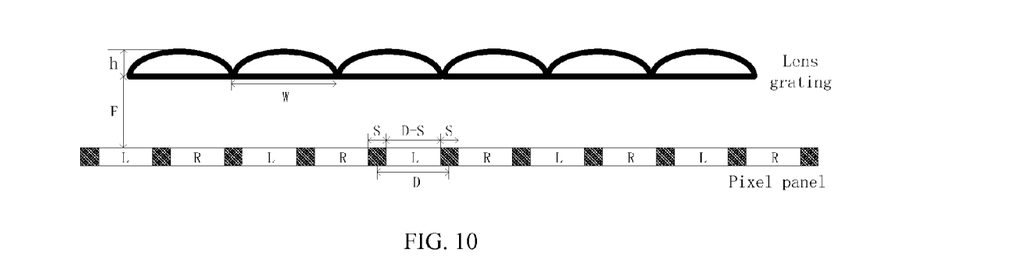
FIG. 10 illustrates certain dimensions of a lens grating and a pixel panel consistent with the disclosed embodiments.

FIG. 10 illustrates certain dimensions of the lens grating and the pixel panel. As shown in FIG. 10, individual lens each having an aperture of W are periodically arranged on the grating array 200. The focal length f of the lens grating may be equivalent to the distance F of the slit gratings. Further, the thickness h of the lens grating formed on the surface of the pixel panel is also the thickness of a single lens. The radius of curvature r1 and r2 of the lens grating are the radius of the curved surfaces corresponding to the two sides of the lens. Usually, r1 is the radius of curvature of the lens surface in combination with the pixel plate and, practically, the lens surface may be set to flat, i.e., the r1 is infinity.

The lens grating may have certain optical aberration, i.e., deviation between the actual image and the ideal image, which is determined according to the lens theory. Usually, the optical aberration of the lens grating is related to the radius of curvature r1 and r2 and lens thickness h, etc. The smaller the optical aberration, the better quality for the lens grating to separate light.

Thus, the 3D display system 120 may adjust certain parameters of the lens grating, such as aperture, focal length, and/or aberration, such that the maximum width B1B2 of the horizontal projection of the black matrix is less than or equal to the inner-eye distance EyeD1, and the minimum width A2C1 of the horizontal projection of alternating black matrix is greater than or equal to the outer-eye distance EyeD2. Under these conditions, the viewer can watch the 3D images with substantially less crosstalk or interference caused by the black matrix.

Further, the parameters of the lens grating may be equivalent to certain parameters of the slit grating parameters, which are already discussed in above sections. Thus, the parameters of the lens grating may be derived based on the parameters of the slit grating.

For example, the spatial crosstalk under the slit grating may be caused by the open ratio M/W of the slit grating; while the spatial crosstalk under the lens grating may be caused by the aberration X' of the lens grating. Thus, the open ratio of the slit grating M/W may be equivalent to the aberration of the lens grating X'. For example, for a same 3D display device, the open ratio of ⅓ of the slit grating and the aberration of 10 um of the lens grating may cause the same amount of spatial crosstalk. The aberration of the lens grating is determined by the front and rear radius of curvature r1 and r2, and the lens thickness h.

Thus, through such equivalent relationships, the lens grating and slit grating can be used interchangeably. For instance, according to the relationships of the formula (1) to (5), the aberration X' of the lens-grating may be obtained, and the radius of curvature r1 and r2, and the lens thickness h may be obtained.

Similarly, when the width of the black matrix S=0, i.e., the black matrix between the adjacent display units is negligible, the aberration X' of the lens-grating may be obtained according to the formula (7) to (11).

Although adjusting the aberration X' of the lens-grating alone can be used in operation, other parameters may also be adjusted alone or in combination. For example, according to the formula (1) and (2), any one or more of the focal length f, aperture W, and the aberration of individual lens can be adjusted to satisfy the formula (1) and (2).

Further, when the viewer moves while viewing the 3D display, the lens gratings can be adjusted in real-time such that the viewer's left and right eyes are kept in the diamond-shaped area L3 and diamond-shaped region R3, respectively, to significantly reduce the effect of the black matrix. For example, formula (6) may be used to adjust the lens grating, where the horizontal vector $\overline{(Q2-Q1)}$ can be calculated into the aperture W of the lens.

Figure 11A:
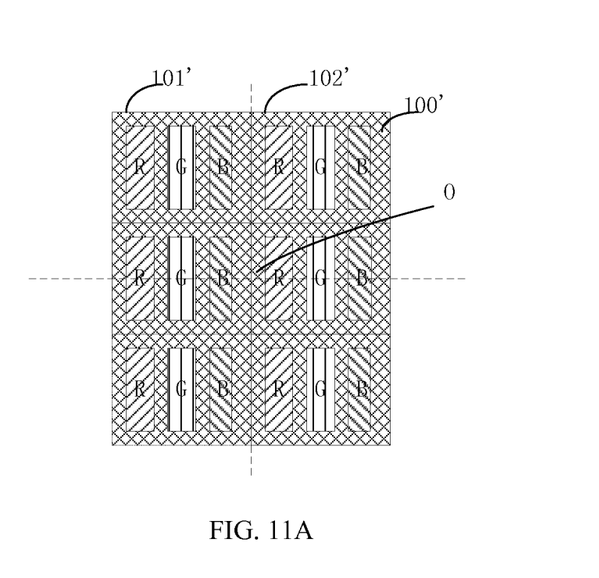
FIGS. 11A-11B illustrate an exemplary black matrix arrangement consistent with the disclosed embodiments.

Alternatively or additionally, the horizontal width S of the black matrix may be changed to reduce the crosstalk caused by the black matrix. FIG. 11A illustrates an exemplary arrangement.

As shown in FIG. 11A, the 3D image with a center point O (O is shown as the intersection point of the two horizontal and vertical lines) is arranged on the pixel panel 100', including main pixels 101' from the first view image and main pixels 102' from the second view image, and pixels 101' and 102' are alternatingly arranged. The black matrix is distributed among the pixels. The detailed dimension illustration is shown in FIG. 11B.

Figure 11B:
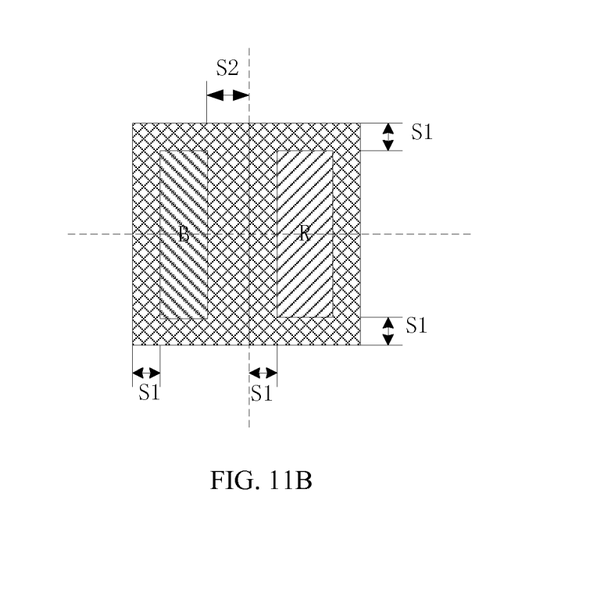

As shown in FIG. 11B, the black matrix is distributed among two pixels. The width of the black matrix in the horizontal direction along pixel 'B' is S1 and S2, S1 is smaller than S2, and the width of the black matrix in the vertical direction is S1. Other configurations may also be used.

The horizontal width of the black matrix along the pixels in the pixel panel may be adjusted. That is, if the horizontal width of the black matrix is different, the maximum value of the horizontal width of the black matrix may be selected to be used in the formula (1) to (5). Such width may be selected according to main pixels or pixel groups. For example, referring to FIG. 11B, the value S can be selected as S=S1+S2 to be used in formula (1) to (5) for calculation. Of course, the selected value of the maximum width should also occur relatively frequently in the horizontal direction of the black matrix distribution.

In addition, when the tracking unit is used to obtain the spatial position of the viewer, the formula (6) may be used to shift the grating in the horizontal direction to achieve the desired viewing effects.

Returning to FIG. 12, when the viewer moves with respect the 3D display system 120, the tracking unit 122 may determine the viewer's spatial position and may obtain the amount of movement of the viewer in a horizontal direction (i.e., the movement from left to right or right to left). The position information may then be provided to the control unit 124.

Based on the horizontal movement amount, the control unit 124 may control the grating array to shift the grating array in the horizontal direction. The shift amount dis' may be determined as:

$$dis'=\Delta X \times F/(F+Z).$$

where ΔX is the amount of horizontal movement of the viewer, the direction of the shift may be the same as the viewer movement or may be opposite to the viewer movement.

Because the grating array is periodically arranged along the horizontal direction, when the shift amount dis' goes beyond the period W of the grating array, a remainder of dis'/W may be used for shifting the grating array (i.e., dis' may be calculated into the period W).

Further, when the grating array is a slit grating array, F is the distance between the slit grating and the pixel panel; when the grating array is a lens grating array, F the focal length of the lens grating. Z is the viewing distance.

The control unit 124 may use a predetermined threshold for determine the horizontal movement. That is, if the viewer's horizontal movement amount exceeds the predetermined threshold, the control unit 124 may determine such horizontal movement needs to be adjusted and to shift the grating array. The predetermined threshold may be set according to tests or experience, i.e., a boundary distance by which a viewer moves in the horizontal direction without undesired viewing effects. Thus, it may be unnecessary for the control unit 124 to shift the grating array every time the viewer moves, but rather only shift the grating array when the horizontal movement is considered as substantial.

With respect to the value of Z, such value may be determined based on empirical values, theoretical values, or statistical values. For example, when the display panel is used in a mobile phone or a tablet, the viewer's viewing distance is usually within a certain range. The value of Z may then be set to a fixed value within this range. The Z value can then be used to calculate the minimum value of the open ratio of the grating array.

Alternatively or additionally, the value Z may be determined by the tracking unit 122. When the viewer moves, the Z value may also be determined in real-time by the tracking unit 122.

After determining the Z value, the control unit 124 may determine the corresponding open ratio of the grating array and to further adjust the grating array with the determined open ratio.

For example, the control unit 124 may calculate the open ratio based on the Z value. More specifically, the control unit 124 may calculate the minimum value of the open ratio of the grating array (e.g., Cnd1, Cnd1', Cnd2, Cnd2', etc.) using the Z value, and may adjust the grating array based on the minimum value.

The control unit 124 may also store two or more ranges of Z value and their respective open ratios. Based on the current Z value, the corresponding range may be determined and the respective open ratio can then be determined. The grating array may be further adjusted based on the determined open ratio. Such approach may be called a staged adjustment method.

The control unit 124 may also calculate a difference between the current viewing distance and the previous viewing distance. When the difference is less than or equal to a predetermined threshold, the control unit 124 does not adjust the open ratio. Otherwise, the current viewing distance Z is used to calculate the minimum open ratio and to adjust the grating array based on the minimum open ratio. Such approach is a conditional real-time adjustment method.

To adjust the grating array based on the minimum open ratio, the control unit 124 may first determine whether the current open ratio of the grating is greater than the minimum open ratio (e.g., Cnd1, Cnd1', Cnd2, Cnd2', etc.). If the current open ratio of the grating is greater than the minimum open ratio, the control unit 124 adjust the grating such that the open ratio of the grating is less than or equal to the minimum open ratio. If the current open ratio of the grating is not greater than the minimum open ratio, the control unit 124 does not adjust the grating array.

Thus, even if the viewing distance Z changes, which causes change in the minimum open ratio, the grating array does not need to be adjusted as long as the open ratio of the grating is less than or equal to the minimum open ratio. Overly frequent adjustment can then be avoided. In certain embodiments, the adjustment may be performed without determining whether the current open ratio of the grating is greater than the minimum open ratio.

By using the disclosed methods and systems, various stereoscopic image display applications based on dynamic grating arrays may be implemented. The parameters of the dynamic grating arrays may be adjusted in real-time to accommodate a viewer's movement with respect to the 3D display device, the viewing experience can be significantly improved.

Other applications, advantages, alternations, modifications, or equivalents to the disclosed embodiments are obvious to those skilled in the art.

What is claimed is:

1. A third-dimensional (3D) display system for displaying a 3D image, comprising:
   a tracking unit configured to determine a spatial position of a viewer of the 3D display system;
   a pixel panel containing alternatingly arranged display units from two or more view images of the 3D image;
   a grating array coupled to the pixel panel to separate light from the two or more view images from the pixel panel; and
   a control unit configured to adjust certain parameters of the grating array such that a maximum width of horizontal projection of edges of adjacent display units through the grating array is less than or equal to an inner-eye distance, and a minimum width of horizontal projection of two edges of a single display unit through the grating array is greater than or equal to an outer-eye distance;
   wherein:
   when the viewer moves with respect to the 3D display system, the tracking unit is configured to determine a movement amount in a horizontal direction; and
   the control unit is configured to, based on the movement amount, shift the grating array in the horizontal direction;
   wherein, to shift the grating array, the control unit is further configured to:
   provided that ΔX is an amount of movement of the viewer in the horizontal direction,
   Z is a viewing distance, F is a distance between a slit grating array and the pixel panel when the grating array is a slit grating array or a focal distance of the lens grating when the grating array is a lens grating array, shift the grating array along the horizontal direction by a shift amount dis' defined as $dis'=\Delta X \times F/(F+Z)$; and when the shift amount dis' is greater than a period of the grating array, calculate the shift amount dis' into the period of the grating array.

2. The 3D display system according to claim 1, wherein the display units include:
   pixel groups, pixels, or sub-pixels.

3. The 3D display system according to claim 1, wherein:
   a black matrix is arranged as boundary of adjacent display units and connects display units from a first view image and a second view image; and
   the display units and the black matrix are arranged alternatingly.

4. The 3D display system according to claim 3, wherein the grating array is a slit grating array and, to adjust the certain parameters of the grating array, the control unit is further configured to:
   provided that W is a period of the slit grating array, F is a distance between the slit grating array and the pixel panel; Z is a viewing distance, D is a width of a display unit, S is a width of the black matrix, EyeD1 is the inner-eye distance, and EyeD2 is the outer-eye distance, adjust an open ratio of each slit grating to a value less than or equal to one of:

$$\frac{F \times (EyeD1 + S)}{W \times (F + Z)} - \frac{S}{W}; \text{ and}$$

$$\left[2 - \frac{(2D + S)}{W}\right] - \frac{F \times [EyeD2 - (2D + S)]}{W \times (F + Z)}.$$

5. The 3D display system according to claim 4, wherein:
   the width S of the black matrix is a maximum width of the black matrix along a horizontal direction.

6. The 3D display system according to claim 3, wherein the grating array is a lens grating array and, to adjust the certain parameters of the grating array, the control unit is further configured to:
   provided that W is an aperture of a lens grating of the lens grating array, F is a focal distance of the lens grating; Z is a viewing distance, D is a width of a display unit, S is a width of the black matrix, EyeD1 is the inner-eye distance, and EyeD2 is the outer-eye distance,
   adjust optical aberration of the lens grating by a crosstalk-equivalent open ratio of a slit grating to a value less than or equal to one of:

$$\frac{F \times (EyeD1 + S)}{W \times (F + Z)} - \frac{S}{W}; \text{ and}$$

$$\left[2 - \frac{(2D + S)}{W}\right] - \frac{F \times [EyeD2 - (2D + S)]}{W \times (F + Z)}.$$

7. A method for third-dimensional (3D) display system having a pixel panel containing alternatingly arranged display units from two or more view images of a 3D image and a grating array coupled to the pixel panel to separate light from the two or more view images from the pixel panel, the method comprising:
   determining a spatial position of a viewer of the 3D display system; and
   adjusting certain parameters of the grating array such that a maximum width of horizontal projection of edges of adjacent display units through the grating array is less than or equal to an inner-eye distance, and a minimum width of horizontal projection of two edges of a single display unit through the grating array is greater than or equal to an outer-eye distance;
   when the viewer moves with respect to the 3D display system, determining a movement amount in a horizontal direction; and
   based on the movement amount, shifting the grating array in the horizontal direction;
   wherein shifting the grating array further includes:
   provided that $\Delta X$ is an amount of movement of the viewer in the horizontal direction,
   Z is a viewing distance, F is a distance between a slit grating array and the pixel panel when the grating array is a slit grating array or a focal distance of the lens grating when the grating array is a lens grating array,
   shifting the grating array along the horizontal direction by a shift amount dis' defined as $dis'\Delta X \times F/(F+Z)$; and when the shift amount dis' is greater than a period of the grating array, calculating the shift amount dis' into the period of the grating array.

8. The method according to claim 7, wherein the display units include:
   pixel groups, pixels, or sub-pixels.

9. The method according to claim 7, wherein:
   a black matrix is arranged as boundary of adjacent display units and connects display units from a first view image and a second view image; and
   the display units and the black matrix are arranged alternatingly.

10. The method according to claim 9, wherein the grating array is a slit grating array and adjusting the certain parameters of the grating array further includes:
    provided that W is a period of the slit grating array, F is a distance between the slit grating array and the pixel panel; Z is a viewing distance, D is a width of a display unit, S is a width of the black matrix, EyeD1 is the inner-eye distance, and EyeD2 is the outer-eye distance,
    adjusting an open ratio of each slit grating to a value less than or equal to one of:

$$\frac{F \times (EyeD1 + S)}{W \times (F + Z)} - \frac{S}{W}; \text{ and}$$

$$\left[2 - \frac{(2D + S)}{W}\right] - \frac{F \times [EyeD2 - (2D + S)]}{W \times (F + Z)}.$$

11. The method according to claim 10, wherein:
    the width S of the black matrix is a maximum width of the black matrix along a horizontal direction.

12. The method according to claim 9, wherein the grating array is a lens grating array and adjusting the certain parameters of the grating array further includes:
    provided that W is an aperture of a lens grating of the lens grating array, F is a focal distance of the lens grating; Z is a viewing distance, D is a width of a display unit, S is a width of the black matrix, EyeD1 is the inner-eye distance, and EyeD2 is the outer-eye distance, adjusting optical aberration of the lens grating by a crosstalk-equivalent open ratio of a slit grating to a value less than or equal to one of:

$$\frac{F \times (EyeD1 + S)}{W \times (F + Z)} - \frac{S}{W}; \text{ and}$$

$$\left[2 - \frac{(2D + S)}{W}\right] - \frac{F \times [EyeD2 - (2D + S)]}{W \times (F + Z)}.$$

* * * * *